(12) United States Patent
Cherubini et al.

(10) Patent No.: US 8,422,162 B2
(45) Date of Patent: *Apr. 16, 2013

(54) DETERMINING A REFERENCE WAVEFORM USED BY A CORRELATOR IN A SERVO CHANNEL

(75) Inventors: Giovanni Cherubini, Rueschlikon (CH); Robert Allen Hutchins, Tucson, AZ (US); Jens Jelitto, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 263 days.

This patent is subject to a terminal disclaimer.

(21) Appl. No.: 12/838,336

(22) Filed: Jul. 16, 2010

(65) Prior Publication Data

US 2012/0014010 A1    Jan. 19, 2012

(51) Int. Cl.
*G11B 5/584* (2006.01)
(52) U.S. Cl.
USPC ........................................... 360/77.12
(58) Field of Classification Search .................. None
See application file for complete search history.

(56) References Cited

U.S. PATENT DOCUMENTS

| | | | |
|---|---|---|---|
| 7,035,040 B2 * | 4/2006 | Molstad et al. | 360/77.12 |
| 7,245,450 B1 * | 7/2007 | Cherubini et al. | 360/73.12 |
| 7,742,254 B2 | 6/2010 | Cherubini et al. | |
| 7,864,487 B2 * | 1/2011 | Cherubini et al. | 360/77.12 |
| 7,881,008 B2 * | 2/2011 | Cherubini et al. | 360/77.12 |
| 7,903,360 B2 * | 3/2011 | Cherubini et al. | 360/51 |
| 8,027,111 B2 * | 9/2011 | Cideciyan et al. | 360/39 |
| 2010/0073800 A1 | 3/2010 | Cherubini et al. | |

OTHER PUBLICATIONS

G. Cherubini, et al., "Characterization and Detection of PPM-encoded Servo Signals in Tape Drives", Communications, Computers and Signal Processing, 2009, PacRim 2009, IEEE Pacific Rim Conference.
U.S. Appl. No. 13/456,895, filed Apr. 26, 2012, entitled "Determining a Reference Waveform Used by a Correlator in a Servo Channel", by inventors G. Cherubini, R.A. Hutchins, and J. Jelitto.
Preliminary Amendment filed Apr. 26, 2012 for U.S. Appl. No. 13/456,895, filed Apr. 26, 2012, entitled "Determining a Reference Waveform Used by a Correlator in a Servo Channel", by inventors G. Cherubini, R.A. Hutchins, and J. Jelitto.
J. Moon, "Discrete-Time Modeling of Transition-Noise-Dominant Channels and Study of Detection Performance", IEEE Transactions on Magnetics, vol. 27, No. 6, Nov. 1991, pp. 4573-4578.
R.C. Barrett, et al., "Timing-Based Tracking-Following Servo for Linear Tape Systems", IEEE Transactions on Magnetics, vol. 34, No. 4, Jul. 1998, pp. 1872-1877.

(Continued)

*Primary Examiner* — Hoa T Nguyen
*Assistant Examiner* — James L Habermehl
(74) *Attorney, Agent, or Firm* — David W. Victor; Konrad & Raynes Dava & Victor LLP (57) ABSTRACT

Provided are a method, servo channel, and tape drive for determining a reference waveform used by a correlator in a servo channel. Sequences of servo signal samples are provided from read servo signals read from a servo pattern on a recording medium. A determination is made of a reference waveform based on the sequences of servo signal samples and the reference waveform is forwarded. Interpolated servo signals are generated. The interpolated servo signal samples and the forwarded reference waveform are received to generate correlation output samples. Position and velocity information are calculated from the correlation output samples.

18 Claims, 7 Drawing Sheets

OTHER PUBLICATIONS

T. Oenning, et al., "Modeling the Lorentzian Magnetic Recording Channel with Transition Noise", IEEE Transactions on Magnetics, vol. 37, No. 1, Jan. 2001, pp. 583-591.

ECMA Standardizing Information and Communication Systems, "Data Interchange on 12, 7 mm 384-Track Magnetic Tape Cartridges—Ultrium-1 Format", Standard ECMA-319, Jun. 2001, pp. 1-160.

G.A. Jaquette, "LTO: A Better Format for Mid-Range Tape", IBM Corporation, Journal of Research and Development, vol. 47, No. 4, Jul. 2003, pp. 429-444.

H. Pozidis, "Decomposition of Noise Sources in Recording Applications Using Symbol-Rate Readback Samples", IEEE Transactions on Magnetics, vol. 40, No. 4, Jul. 2004, pp. 2320-2322.

S. Van Beneden, et al., "Adaptive Decomposition of Noise Sources in Digital Recording Systems with Media Noise", IEEE Transactions on Magnetics, vol. 43, No. 2, Feb. 2007, pp. 561-571.

G. Cherubini, et al., "Synchronous Servo Channel Design for Tape Drive Systems", ASME Information Storage and Processing Systems Conference, Jun. 2007, pp. 160-162.

G. Cherubini, et al., "Characterization of Timing Based Servo Signals", Intermag 2008, p. 600.

A.J. Argumedo, et al., "Scaling Tape-Recording Areal Densities to 100 Gb/in2", IBM Corporation, Journal of Research and Development, vol. 52, No. 4/5, Jul./Sep. 2008, pp. 1-15.

\* cited by examiner

DETERMINING A REFERENCE WAVEFORM USED BY A CORRELATOR IN A SERVO CHANNEL

BACKGROUND

1. Field

The present invention relates to a method, servo channel, and tape drive for determining a reference waveform used by a correlator in a servo channel.

2. Description of the Related Art

In timing-based servo (TBS) systems, recorded servo patterns consist of magnetic transitions with two different azimuthal slopes. Head position is derived from the relative timing of pulses, or dibits, generated by a narrow head reading the servo patterns. TBS patterns also allow the encoding of additional longitudinal position (LPOS) information without affecting the generation of the transversal position error signal (PES). This is obtained by shifting transitions from their nominal pattern position using pulse-position modulation (PPM). Traditionally, the detection of LPOS information bits is based on the observation of the arrival times of the shifted dibit peaks within the servo bursts at the servo reader output. A specification for the servo format in current tape drives is provided by the linear tape-open (LTO) format. The complete format for LTO drives of generation 1 (LTO-1) was standardized by the European Computer Manufacturers Association (ECMA) in 2001 as ECMA-319. Additional information on LTO technology, in particular on LTO drives of generations 2 to 5 (LTO-2 to LTO-5), where the servo format was not modified, can be found on the World Wide Web (www) at ultrium.com.

Figure 1:
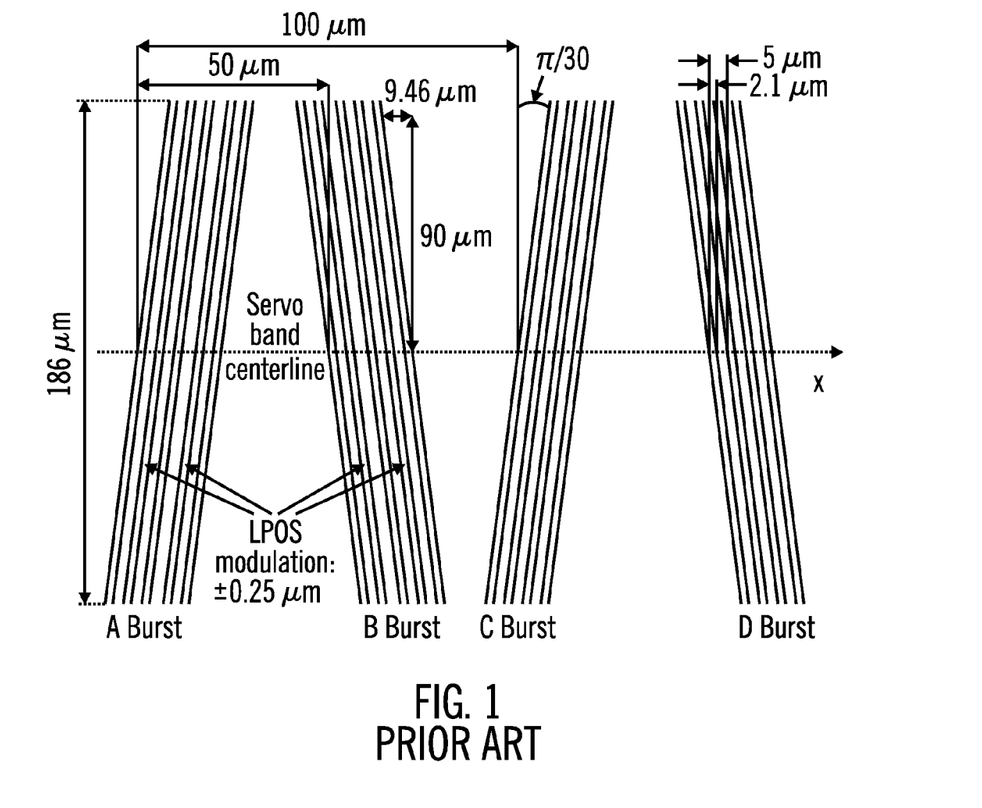
FIG. 1 illustrates a servo frame in a manner known in the prior art.

The timing-based servo (TBS) technology, which was developed specifically for linear tape drives and is also used in all LTO tape drive products, provides the basic structure of a servo frame, consisting of four servo bursts, as shown in FIG. 1. The signal obtained by reading the servo pattern is used to extract essential servo-channel parameters such as tape velocity, read head transversal (y)-position information, and longitudinal position (LPOS) information, which is encoded by using pulse-position modulation (PPM) with a modulation depth of ±0.25 µm in LTO drives, as also shown in FIG. 1.

The servo frame of FIG. 1 has transitions on tape with an azimuth angle of 6 degrees. Each stripe is translated by a servo reader into a pulse called dibit, which exhibits a positive peak and a negative peak. The four A, B, C, and D bursts include from left-to-right a sequence of 5-5-4-4 dibits. The arrival times of the dibit peaks in the servo bursts are also used to determine the transversal position of the reader. The frequency at which the bursts appear can be used to determine the velocity of tape. One may also decode bits encoded in the second and fourth dibits in the A and B bursts to reconstruct the longitudinal position.

In legacy timing-based servo (TBS) systems, the estimates of the servo reader lateral position, the tape velocity, and the longitudinal position (LPOS) information are directly obtained by monitoring the peak arrival times of the dibits of the servo bursts. The filtering for the servo reader signal used for the computation of the estimates is normally achieved by an anti-aliasing low-pass filter in the analog domain, prior to analog-to-digital conversion. At low tape velocities, however, a fixed low-pass filter exhibits significant excess bandwidth, which leads to excess noise level, and may greatly reduce the reliability of the computed estimates, depending on the tape velocity.

To mitigate the excess noise problem, the clock frequency of the analog-to-digital converter sampling the servo reader signal may be selected from a finite set of frequencies, which are generated by a phase-lock loop. This approach has the disadvantage that the bandwidth of the anti-aliasing filter must be selectable. A further disadvantage is that the bandwidth of the servo reader signal for the minimum cruise velocity of the tape is typically significantly smaller than the minimum available clock frequency of the analog-to-digital converter (ADC). Therefore excess noise bandwidth cannot be eliminated fully at low tape velocities. Furthermore, in legacy TBS systems the detection of LPOS information symbols, which are encoded in the servo bursts using pulse-position modulation, is performed by measuring the distances between peak arrival times and making decisions based on the measured distances, a suboptimal method that does not consider the energy of the modulated dibits.

Figure 2:
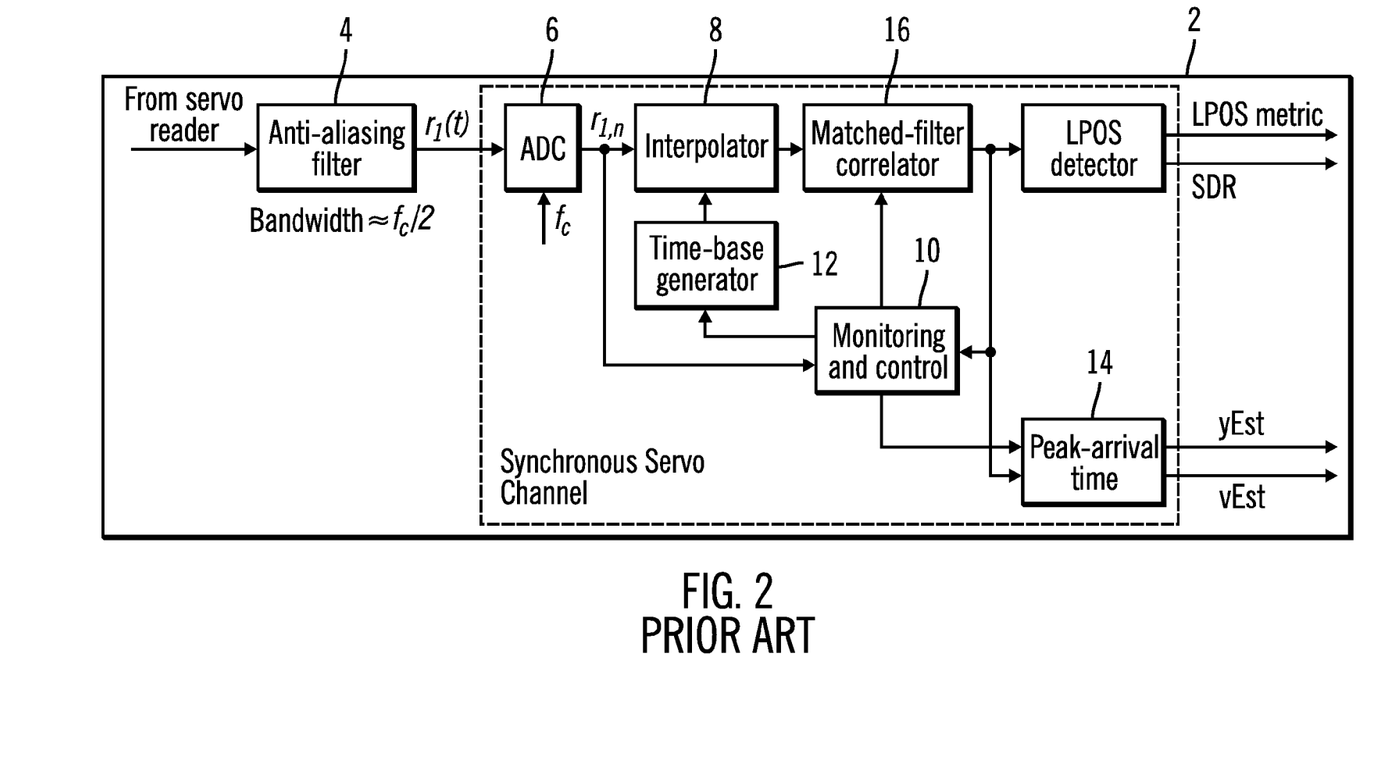
FIG. 2 illustrates an embodiment of a synchronous servo channel as known in the art.

In a current synchronous servo channel architecture, as shown in FIG. 2, the excess-noise problem in a servo reader signal with bandwidth that depends on tape velocity is solved without resorting to a low-pass filter with variable cutoff frequency. The need for a low-pass filter with variable bandwidth is avoided by introducing a matched filter interpolator/correlator, which is included in the synchronous servo channel prior to lateral position-error signal (PES) estimation, tape velocity estimation, optimum matched-filter LPOS symbol detection, and signal-to-distortion ratio estimation, as shown in FIG. 2.

FIG. 2 illustrates an architecture of a servo channel 2 according to the prior art, where an anti-aliasing filter 4 receives input from a servo reader (not shown). The output of the anti-aliasing filter 4 is routed to an analog-to-digital converter (ADC) 6 in the servo channel 2. The servo signal samples output by the ADC 6 are input to a servo channel signal interpolator 8 (also referred to as an "interpolator") and a monitoring and control component 10. The output of the monitoring and control component 10 is routed to a time-base generator 12, to the matched-filter correlator 16 and to a peak-arrival time component 14.

The matched-filter interpolator/correlator 16 ensures that optimum filtering of the servo reader signal is performed not only at constant tape velocity, but also during acceleration and deceleration. Optimum signal filtering is thus achieved for the computation of the various estimates during all modes of operation. Proper matched-filter operation in the synchronous servo channel, however, requires the knowledge of the dibit response obtained from the servo reader. The dibit waveform depends on the definition of parameters for the servo patterns as defined, e.g., in the LTO specification, which are azimuth angle a (a=6 deg. for LTO 1 to 5), servo stripe width t (minimum distance between magnetic transitions, t=2.1 µm for LTO 1 to 5), and servo reader width. In the current synchronous servo channel implementation, matched filtering is normally performed assuming a standard reference waveform with nominal servo format parameters and given servo reader width. The current synchronous servo channel implementation is very robust for a wide range of system parameters. However, if large mismatches with respect to the LTO specification occur due to badly formatted tape cartridges or otherwise degraded operating conditions, this might lead to severe degradation in the quality of PES estimation and LPOS detection.

There is a need in the art for improved techniques for determining improved dibit reference waveforms that provide better match to the read servo signals in a synchronous servo channel.

SUMMARY

Provided are a method, servo channel, and tape drive for determining a reference waveform used by a correlator in a servo channel. Sequences of servo signal samples are provided from read servo signals read from a servo pattern on a recording medium. A determination is made of a reference waveform based on the sequences of servo signal samples and the reference waveform is forwarded. Interpolated servo signals are generated. The interpolated servo signal samples and the forwarded reference waveform are received to generate correlation output samples. Position and velocity information are calculated from the correlation output samples.

DETAILED DESCRIPTION

Figure 3:
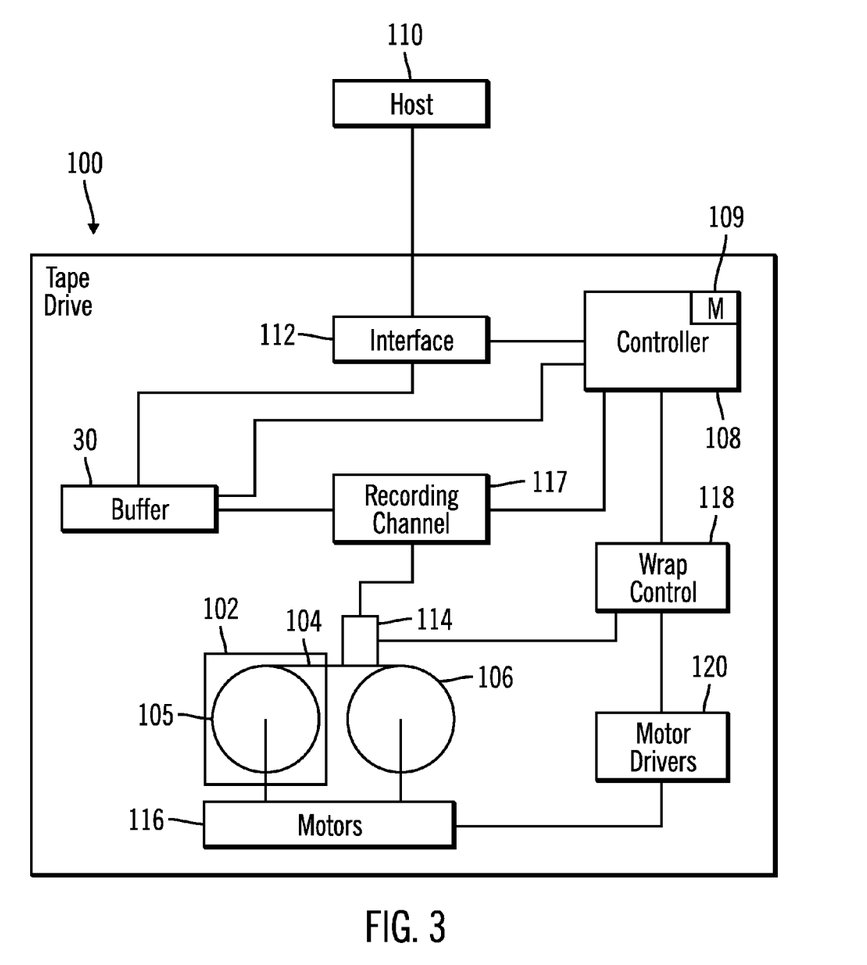
FIG. 3 illustrates an embodiment of a tape drive in which described embodiments are implemented.

FIG. 3 illustrates an embodiment of a magnetic tape drive 100. The magnetic tape drive provides a means for reading and writing information with respect to a magnetic tape 104 of a magnetic tape cartridge 102. Magnetic tape cartridges include a magnetic tape storage medium to record data to be retrieved at a subsequent time. Further, the magnetic tape cartridges may be interchanged between tape drives, such that a magnetic tape written on one tape drive will be read by another tape drive. The magnetic tape cartridge 102 comprises a length of magnetic tape 104 wound on one or two reels 105, 106.

A single reel magnetic tape cartridge 102 is illustrated, examples of which are those adhering to the Linear Tape Open (LTO) format. An example of a magnetic tape drive 100 is the IBM 3580 Ultrium magnetic tape drive based on LTO technology. A further example of a single reel magnetic tape drive and associated cartridge is the IBM 3592 TotalStorage Enterprise magnetic tape drive and associated magnetic tape cartridge. An example of a dual reel cartridge is the IBM 3570 magnetic tape cartridge and associated drive. In alternative embodiments, additional tape formats that may be used include Digital Linear Tape (DLT), Digital Audio Tape (DAT), etc.

The magnetic tape drive 100 comprises one or more controllers 108 of a recording system for operating the magnetic tape drive in accordance with commands received from a host system 110 received at an interface 112. A controller typically comprises logic and/or one or more microprocessors with a memory 109 for storing information and program information for operating the microprocessor(s). The program information may be supplied to the memory via the interface 112, by an input to the controller 108 such as a floppy or optical disk, or by read from a magnetic tape cartridge, or by any other suitable means. The magnetic tape drive 100 may comprise a standalone unit or comprise a part of a tape library or other subsystem. The magnetic tape drive 100 may be coupled to the host system 110 directly, through a library, or over a network, and employ at interface 112 a Small Computer Systems Interface (SCSI), an optical fiber channel interface, etc. The magnetic tape cartridge 102 may be inserted in the magnetic tape drive 100, and loaded by the magnetic tape drive so that one or more read and/or write heads 114 of the recording system read and/or write information in the form of signals with respect to the magnetic tape 104 as the tape is moved longitudinally by motors 116 which rotate the reels 105, 106 to move the magnetic tape 104 with respect to the read head(s) 114 such that the read head(s) may detect magnetic signals on the magnetic tape. A recording channel of the read/write channel digitally samples the magnetic signals detected by the read head(s) to provide digital samples of the magnetic signals for further processing.

The magnetic tape typically comprises a plurality of parallel tracks, or groups of tracks. In certain tape formats, such as the LTO format, the tracks are arranged in a serpentine back and forth pattern of separate wraps, as is known to those of skill in the art. Also as known to those of skill in the art, the recording system may comprise a wrap control system 118 to electronically switch to another set of read and/or write heads, and/or to seek and move the read and/or write heads 114 laterally of the magnetic tape, to position the heads at a desired wrap or wraps, and, in some embodiments, to track follow the desired wrap or wraps. The wrap control system 118 may also control the operation of the motors 116 through motor drivers 120, both in response to instructions by the controller 108.

Controller 108 also provides the data flow and formatter for data to be read from and written to the magnetic tape, employing a buffer 30 and a recording channel 117, as is known to those of skill in the art.

Figure 4:
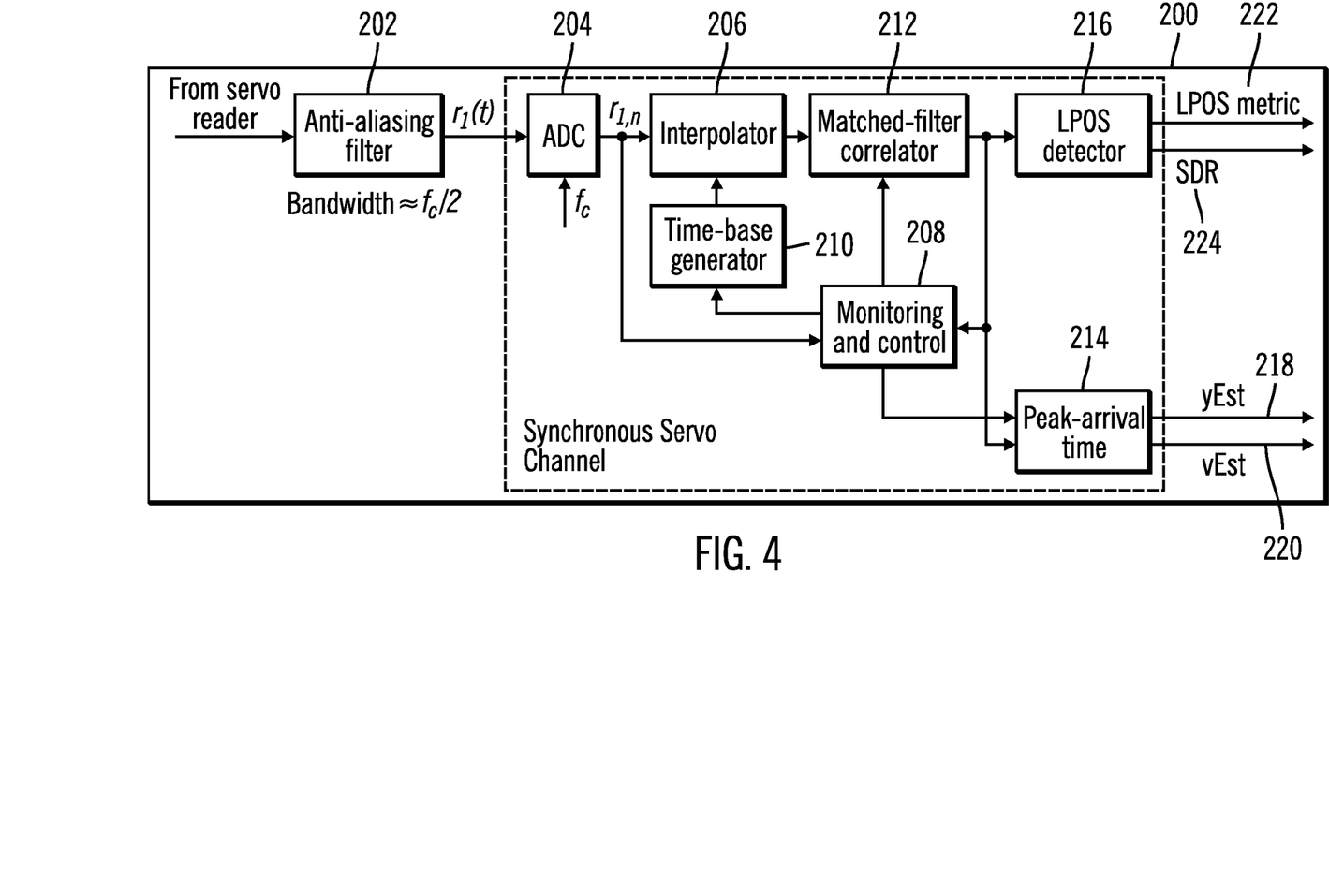
FIG. 4 illustrates an embodiment of a synchronous servo channel.

FIG. 4 illustrates an embodiment of a synchronous servo channel 200, which may be implemented in the recording channel 117 of the tape drive 100 (FIG. 3), that is used to extract essential servo-channel parameters such as tape velocity, read head y-position, and longitudinal position (LPOS) information. In the servo channel 200, an anti-aliasing filter 202 receives input from a servo reader (not shown). The output of the anti-aliasing filter 202 $r_1(t)$ is routed to an analog-to-digital converter (ADC) 204. The ADC operates at a clock cycle with frequency (fc). The output of the ADC 204 goes into a servo channel signal interpolator 206 (also referred to as an "interpolator") and a monitoring and control component 208. The output of the monitoring and control component 208 is routed to a time-base generator 210, to the matched-filter correlator 212 and to a peak-arrival time component 214. The output of the time-base generator 210 consists of a plurality of signals including timing information that are routed to the interpolator 206.

The interpolator 206 receives the sequence of servo signal samples $r_{1,n}$ from the ADC 204 and interpolation time instants (tn) from the time-base generator 210 and outputs a sequence of interpolated servo samples $r_1(t_n)$ at interpolation time instants (tn) to the matched filter correlator 212. The correlator 212 receives the interpolated servo signal samples and outputs a sequence of correlation output samples $c(t_n)$ at interpolation time instants (tn) into an LPOS detector 216 and peak arrival time computation unit 214. The monitoring and control block 208 provides information to the time-base generator 210 to determine the times at which the interpolator 206 outputs servo signal samples to the correlator 212.

The peak-arrival time computation unit 214 receives a sequence of correlation output samples c(tn) from the correlator 212, along with the interpolation time instants (tn), and the monitoring and control component 208 output control signals. The peak arrival time unit 214 computes, at least once per servo frame, estimates of tape velocity vEst 220 and of y-position of the servo reader yEst 218, that are based on peak-arrival times, i.e., the instants at which peaks of the correlator output signal occur. As soon as a sequence of correlation peaks corresponding to the sequence of [4 4 5 5] peaks within a servo frame is detected, the tape velocity and reader y-position estimates are computed. The sequence of [4 4 5 5] peaks is characteristic of the sequence of C, D, A, and B servo bursts of a servo frame.

The LPOS detector 216 receives as input the correlator 212 output samples and outputs an LPOS metric 222 and a signal-to-noise plus distortion ratio (SDR) estimate 224.

The output of the correlator 212 is used to determine the arrival time of peaks of the correlator output signal after filtering the servo signal samples with the reference waveform, and from this information the LPOS detector 216 and peak arrival time component 214 can extract the estimates of the lateral position 218 of the head 114 (FIG. 3), of the velocity 220, of the longitudinal position signal (LPOS) 222 encoded in the servo pattern, and the SDR 224.

The correlator 212 uses a reference waveform provided by the monitoring and control unit 208 to perform filtering of the interpolated read servo signal. The monitoring and control block 208 provides the correlator 212 correlator coefficients to initialize the reference waveform. In the ideal situation, the reference waveform used by the correlator 212 matches the sampled dibit waveform obtained from the interpolated read servo signal. The reference waveform used by the correlator 212 may not match the actual sampled dibit waveform. If there is a mismatch of the reference waveform used by the correlator 212 to generate an output signal, from which the arrival times of the dibit peaks of the read waveform from the servo reader are determined, in the presence of channel noise, then the performance of the servo channel in estimating the values 218, 220, 222, and 224, is worse than in the case of a perfect matching. In such case, the correlator 212 can less accurately determine the arrival times of the dibit peaks of the read servo signal.

Figure 5A:
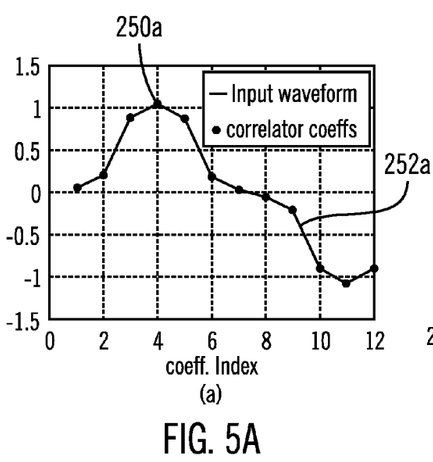
FIGS. 5a and 5b illustrate how a reference waveform represented by correlator coefficients matches the input waveform read from the servo channel.
Figure 5B:
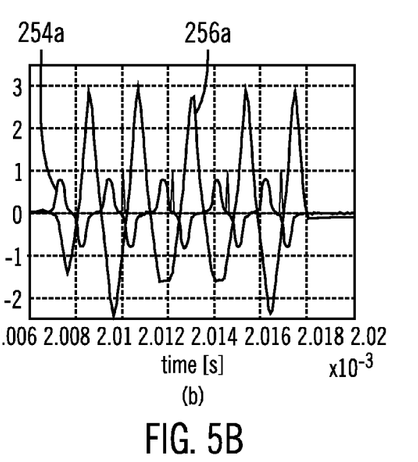

FIG. 5a shows the situation when the vector of correlator coefficients from the monitoring and control block 208, represented by the dots, e.g., 250a, matches the input waveform, represented by the line 252a, referred to as matched filtering. In this case, the dibit waveform obtained by reading back the servo pattern written on the tape, shown as the input waveform 252a, matches the reference waveform, as represented by the correlator coefficients, used by the correlator 212 to generate an output signal. FIG. 5a indicates a situation of ideal matched filtering because the vector of correlator coefficients representing the reference waveform matches the samples of the read waveform from the servo pattern. FIG. 5b shows that the positive and negative peaks of the dibits of the read servo signal 254a correspond to the peaks of the correlator output 256a, which allows the components 214 and 216 to provide accurate estimates 218, 220, 222, 224. In particular, in the presence of additive broadband noise the filtering operation performed by the matched-filter correlator results in the largest possible signal-to-noise ratio at the correlator output.

Figure 6A:
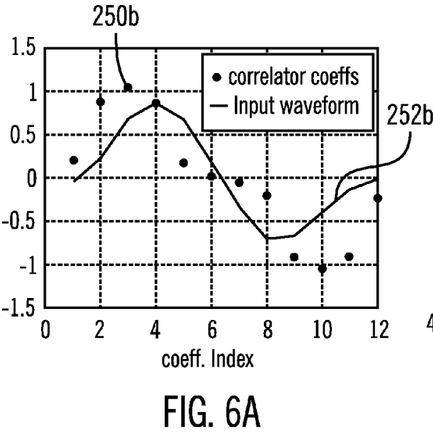
FIGS. 6a and 6b illustrate how a reference waveform represented by correlator coefficients mismatches with the input waveform read from the servo channel.
Figure 6B:
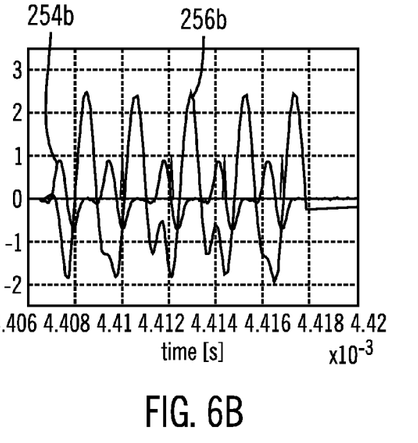

FIGS. 6a and 6b represent a situation where the dibit waveform from the read servo pattern 252b, does not match the vector of correlator coefficients 250b, which represents a symmetric reference waveform. This mismatch of the readback dibits 254b and the correlator coefficients 250b results in correlator output 256b that is significantly more noisy than the correlator output obtained in the case of matched filtering. Consequently the arrival times of the dibit peaks of the read servo signal are less accurately estimated, which negatively affects the accuracy of the estimates 218, 220, 222, and 224.

The described embodiments provide techniques for the monitoring and control block 208 to select a reference dibit waveform for matched-filter operation from a predetermined set of dibit responses by using an estimate of the transition distance t, which is obtained by measuring the average distance between the positive peaks and the negative peaks of the dibits during acquisition. In a second step, a more accurate reference dibit waveform is obtained by averaging an ensemble of read servo signal sample sequences from consecutive bursts. The identification procedure may be periodically repeated to cope with time-varying servo channel characteristics. In the case of severely distorted waveforms, where the estimation of the transition distance is not possible, a reference dibit waveform needs to be selected according to the servo format specification.

Figure 7:
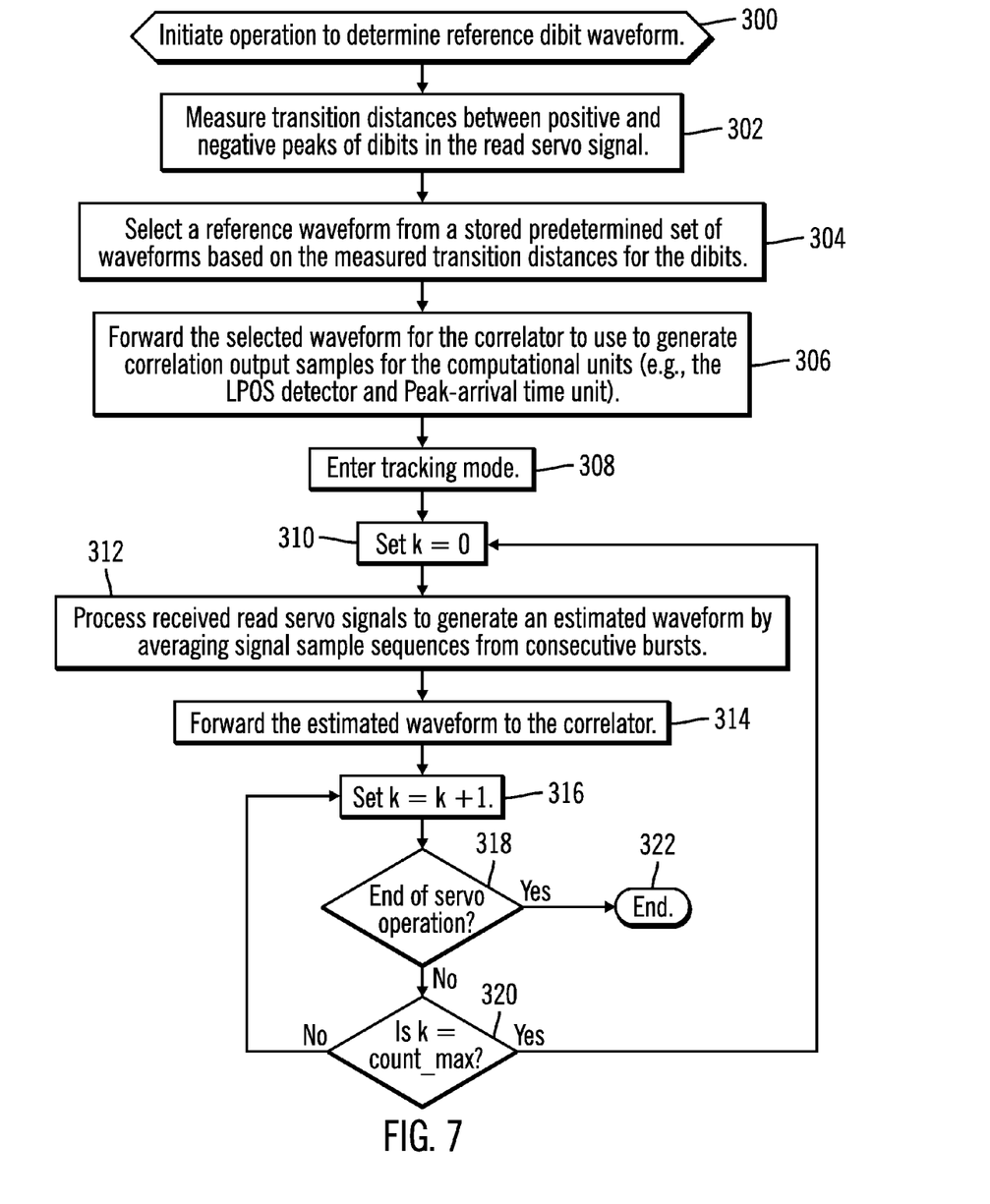
FIG. 7 illustrates an embodiment of operations performed in the synchronous servo channel to determine a reference waveform for the correlator.

FIG. 7 illustrates an embodiment of operations which are preferably performed by the monitoring and control unit 208 to determine a reference waveform to provide to the correlator 202. Upon initiating (at block 300) an operation to determine a reference dibit waveform, the monitoring and control unit 208 measures (at block 302) transition distances between the positive and negative peaks of dibits in the read servo signal. The monitoring and control unit 208 receives valid sequences of dibits with positive and negative peaks [5 5 4 4] and in one embodiment computes a distance $\hat{d}$ between the positive and negative peaks of a dibit according to equation (1) below:

$$\hat{d} = \tau_p \hat{v} \quad (1),$$

where $\tau_p$ denotes an estimate of a time interval between the positive peak and the negative peak of a dibit and $\hat{v}$ is an estimate of the tape velocity.

The monitoring and control unit 208 then selects (at block 304) a reference waveform from a stored predetermined set of waveforms based on the measured transition distances for the dibits. In one embodiment, using the measured distance between the peaks to select a reference waveform comprises selecting one waveform from the predetermined set having a distance between peaks that most closely approximates the measured distance between the peaks. In one embodiment, the predetermined sets of waveforms are based on industry standard specifications for servo signals, such as the LTO specification, selecting the waveform based on the measured distance between the peaks comprises selecting one waveform from the predetermined set having a distance between peaks that most closely approximates the measured distance between the peaks. In one embodiment, the predetermined reference waveforms are computed for the nominal values of the azimuth angle and the servo reader width, and a finite number of values of the servo stripe width t. The selected reference dibit waveform at block 304 is the one that was precomputed for the servo stripe width, which has the minimum distance from the estimate $\hat{d}$. In the case of severely distorted waveforms, where the estimation of the transition distance is not possible, a reference dibit waveform needs to be selected according to the servo format specification. The monitoring and control unit 208 forwards (at block 306) the selected reference waveform from the predetermined set according to the servo format specification to the correlator 202 to use to generate correlation output samples for the computational units (e.g., the LPOS detector 216 and peak-arrival time unit 214).

After forwarding the reference waveform from the predetermined set, the monitoring and control unit 208 enters a tracking mode (at block 308) to perform the operations at block 310 to block 320 to calculate reference waveforms from interpolated servo signal samples to provide a reference waveform based on the actual read servo signals. In one embodiment, the read servo signal corresponding to a burst of four dibits within a servo frame, e.g., a "C-burst" within the A, B, C, and D sequences of [5 5 4 4] servo bursts, may be modeled according to equation (2) below:

$$r_C(nT;y,v) = q_C(nT;y,v) + \eta(nT), \quad (2)$$

where y denotes the lateral position of the servo reader, $\eta(nT)$ is a noise sample, T is the sampling interval, and $q_C(nT;y,v)$ is the read servo signal, which is given by equation (3) below:

$$q_C(nT; y, v) = \sum_{i=0}^{3} g_d\left(nT - \frac{y\tan(\alpha)}{v} - iT_d; v\right), \quad (3)$$

where $g_d(t; v)$ denotes the dibit response and $T_d$ is the time interval between dibits in a burst. In the embodiment of equation (3), the dibit duration has been assumed finite, so that only the dibits of the "C-burst" appear.

In tracking mode (at block 308), the monitoring and control unit 208 sets (at block 310) a counter k=0. The counter k denotes a clock cycle at which the sample is generated within a servo frame and a clock interval (Tc) is related to the fixed ADC 204 clock frequency fc according to Tc=1/fc. The monitoring and control unit 208 processes (at block 312) the received read servo signals to generate an estimated waveform by averaging signal sample sequences from consecutive bursts. To estimate the waveform where each read servo signal comprises dibits read within a frame, the dibits of the read servo signals are measured at a same timing phase in the read frames of the read servo signals to determine an average for each dibit calculated from the read servo signals read at the same timing phase for the dibit. For instance, to obtain an estimate $\hat{q}_c(nT; y, v)$ of the signal sequence by averaging, an ensemble of signal sample sequences is obtained from consecutive "C-bursts". The signal samples must be obtained with the same timing phase for different "C-burst" sequences, and for arbitrary values of servo reader lateral position within the servo band. This task is accomplished by the synchronous servo channel. One of the functions of the servo channel 200 is the generation of a time base that allows interpolation at the desired time instants of the signal samples that are taken by the ADC 204 operated with a free-running clock. An estimate $\hat{q}_c(nT; y, v)$ of the signal sequence is thus obtained from an ensemble of N interpolated "C-burst" sequences according to equation (4) below:

$$\hat{q}_C(mT_s; v) = \frac{1}{N} \sum_{l=0}^{N-1} r_C(mT_s - lT_F - \Delta(y); y, v), \quad -M_1 \leq m \leq M_2, \quad (4)$$

where $T_s$ denotes the sampling interval after interpolation, $T_F$ is the duration of a servo frame, $M_1$ and $M_2$ are integers chosen such that the identified "C-burst" is entirely spanned, and $\Delta(y)$ is a suitable delay that depends on the lateral position of a read head with respect to the servo pattern on the recordable medium, so that the first sample of the identified "C-burst" has a predetermined phase. In equation (4), the dependency on the reader lateral position y is thus dropped after interpolation. The desired dibit waveform can then be extracted from the identified "C-burst". In this way, the estimated waveform is calculated based on characteristics of the bursts and a velocity of the recordable medium.

The monitoring and control unit 208 then forwards (at block 314) the estimated reference waveform, e.g., $\hat{q}_C(mT_s; v)$, to the correlator 202 to use. After the clock cycle and reading the servo frame, the counter k is incremented (at block 316). If (at block 318) the servo operation has not ended and if (at block 320) the counter k is not a maximum value (count_max), then control proceeds back to block 316 to increment the counter and wait until the counter reaches a maximum value (count_max), where the counter runs with the ADC 204 clock. After the counter reaches a maximum value from the yes branch of block 320, control proceeds back to block 310 to perform another iteration of generating an estimated waveform, e.g., $\hat{q}_C(mT_s; v)$, based on new read servo signals. The counter is reset upon obtaining a new reference dibit waveform. If (at block 318) the servo operation has ended, then control ends (at block 322) until a subsequent acquisition period is initiated by the monitoring and control block.

Figure 8A:
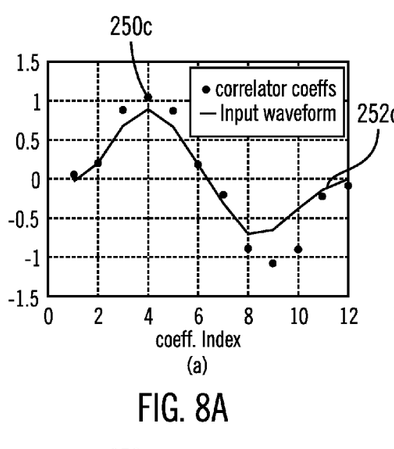
FIGS. 8a and 8b illustrate how a reference waveform represented by correlator coefficients partially matches with the input waveform read from the servo channel.
Figure 8B:
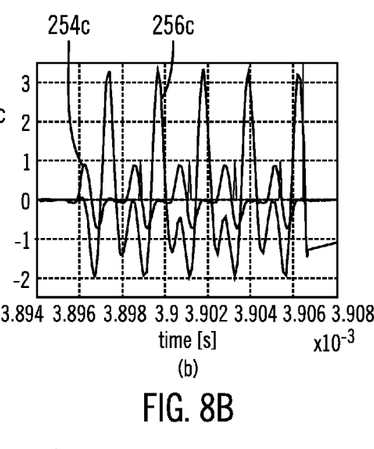

FIG. 8a illustrates the input waveform 252c compared to the reference waveform 250c selected at block 304 in FIG. 7 from a predetermined set of waveforms. The reference waveform provides only partially matched correlator coefficient parameters and hence the arrival times of the dibit peaks of the read servo signal are determined in a suboptimum manner. FIG. 8b further reflects the mismatch of the read-back dibits 254c and the correlator output 256c.

Figure 9A:
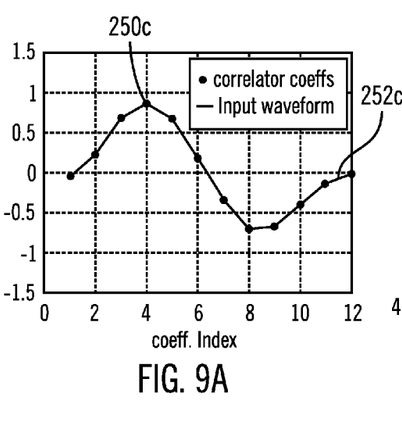
FIGS. 9a and 9b illustrate how a reference waveform represented by correlator coefficients perfectly matches with the input waveform read from the servo channel.
Figure 9B:
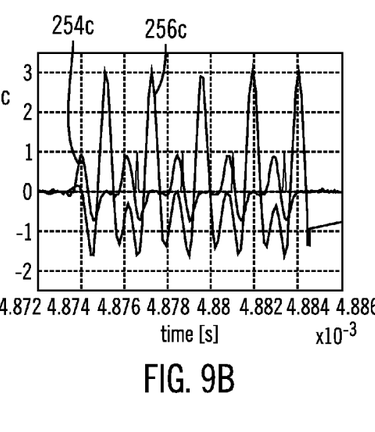

FIG. 9a shows the result of the estimated waveform, determined at block 312 in FIG. 7, where the input waveform 252d is matched with the vector of correlator coefficients 250d. FIG. 9b shows the input dibits 254d peaks matching the peaks of the correlator output 256d providing a perfect match, thus allowing the correlator 202 to determine the arrival times of the dibit peaks of the read servo signal in an optimum manner.

The described embodiments provide techniques for a monitoring and control unit 208 to estimate the vector of correlator coefficients by processing read servo signals so that the reference waveform represented by the vector of correlator coefficients matches the input waveform, thus allowing a more accurate determination of the peaks of the signal and more accurate determination of the LPOS detector 216 and peak arrival time 214 outputs 218, 220, 222, and 224. This in turn results in lower standard deviation of position-error signal for track-following servo and improved reliability of LPOS symbol detection.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

For instance, the described components of the servo channel 200 described with respect to FIG. 4 may comprise discrete logic, ASIC (application specific integrated circuit), FPGA (field programmable gate array), custom processors, etc. The described components of the servo channel embodiments and the operations of the servo channel components described with respect to FIG. 4 may alternatively be implemented in subroutines in programs or other software implementations executed by a processor. Such programs implementing the operations of the servo channel components described with respect to FIG. 4 may be implemented in a computer readable medium, such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.).

The components shown in FIG. 4 as separate components may be implemented in a single circuit device or functions of one illustrated component may be implemented in separate circuit devices. Moreover, operations described with respect to certain components, such as generating the interpolation time instants and correlating the data, may be performed by other components in the servo channel. The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

The term logic may include, by way of example, software, hardware, firmware, and/or combinations of software and hardware.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIG. 7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A servo channel for a tape drive coupled to a servo reader reading a servo pattern encoded on a recording medium, comprising:
   an analog-to-digital converter (ADC) receiving read servo signals from the servo pattern read by servo reader and providing sequences of servo signal samples;
   a monitoring and control unit coupled to the ADC and operable to select a selected reference waveform from a predetermined set of waveforms based on the sequences of servo signal samples and forward the selected reference waveform;
   an interpolator coupled to the ADC operable to generate interpolated servo signal samples;
   a correlator coupled to receive the interpolated servo signal samples from the interpolator and the forwarded selected reference waveform from the monitoring and control unit, and operable to generate correlation output samples; and
   computational units coupled to the correlator to receive the correlation output samples and operable to calculate position and velocity information from the correlation output samples.

2. The servo channel of claim 1, wherein the monitoring and control unit determines and forwards the reference waveform by:
   measuring distances between peaks within dibits in the read servo signals, wherein the selecting of the selected reference waveform from the predetermined set of waveforms is based on the measured distance between the peaks;
   processing sequences of servo signal samples, following the forwarding of the selected reference waveform from the predetermined set, to generate an estimated waveform; and
   forwarding the estimated reference waveform, wherein the correlator uses the selected reference waveform and the estimated reference waveform to generate correlation output samples to the computational units.

3. The servo channel of claim 2, wherein the predetermined set of waveforms are based on industry standard specifications for servo signals, and wherein selecting the selected reference waveform based on the measured distance between the peaks comprises selecting one waveform from the predetermined set having a distance between peaks that most closely approximates measured distance between the peaks.

4. The servo channel of claim 2, wherein the monitoring and control unit processes the sequences of servo signal samples to generate the estimated reference waveform by averaging the sequences of servo signal samples from consecutive servo bursts and wherein the measured distance comprises a distance between a positive peak and a negative peak of a dibit.

5. The servo channel of claim 4, wherein each received read servo signal comprises dibits read within a frame, and wherein the averaging of the sequences of servo signal samples comprises measuring the dibits of the read servo signals at a same timing phase in the read frames of the read servo signals to determine an average for each dibit calculated from the sequences of servo signal samples read at the same timing phase for the dibit.

6. The servo channel of claim 5, wherein the estimated reference waveform is calculated based on characteristics of the servo frame, and a velocity of the recordable medium.

7. The servo channel of claim 4, wherein the estimated signal sequence at sampling intervals is calculated as $$\hat{q}_C(mT_S; v) = \frac{1}{N}\sum_{l=0}^{N-1} r_C(mT_S - lT_F - \Delta(y); y, v), \quad -M_1 \le m \le M_2,$$

where TS comprises a sampling interval after interpolation, TF comprises a duration of a servo frame, N is a number of burst sequences, M1 and M2 are chosen so that the sampled burst sequences are entirely spanned, v is the velocity of the recordable medium, y is the lateral position of a read head with respect to the servo pattern on the recordable medium, and $\Delta(y)$ comprises a delay that depends on the lateral position of the read head.

8. The servo channel of claim 1, wherein the monitoring and control unit is further operable to:
   initialize a counter in response to entering tracking mode
   increment the counter in response to a clock cycle;

generate a new reference waveform in response to the counter reaching a counter maximum value; and forward the new reference waveform to the correlator.

9. The servo channel of claim 8, wherein the monitoring and control unit is further operable to:

reset the counter to zero in response to generating the new reference waveform; and continue to increment the counter, perform the operation to generate the new reference waveform, and reset the counter to zero until servo operations end.

10. A tape drive coupled to a recording medium, comprising:

a servo reader for reading a servo pattern encoded on the recording medium; and a servo channel coupled to the servo reader to receive read servo signals from the servo reader and operable to perform:

processing the received read servo signals read from the servo reader;

selecting a selected reference waveform from a predetermined set of waveforms based on the sequences of servo signal samples;

forwarding the selected reference waveform;

generating interpolated servo signal samples:

receiving the interpolated servo signal samples and the forwarded selected reference waveform to generate correlation output samples; and calculating position and velocity information from the correlation output samples.

11. The tape drive of claim 10, wherein the determining and forwarding of the reference waveform comprises:

measuring distances between peaks within dibits in the read servo signals, wherein the selecting of the selected reference waveform from the predetermined set of waveforms is based on the measured distance between the peaks;

processing sequences of servo signal samples, following the forwarding of the selected reference waveform from the predetermined set, to generate an estimated reference waveform; and forwarding the estimated reference waveform, wherein the selected reference waveform and the estimated reference waveform are used to generate correlation output samples.

12. The tape drive of claim 11, wherein the predetermined set of waveforms are based on industry standard specifications for servo signals, and wherein selecting the selected reference waveform based on the measured distance between the peaks comprises selecting one waveform from the predetermined set having a distance between peaks that most closely approximates measured distance between the peaks.

13. The tape drive of claim 11, wherein processing the received read servo signals to generate the estimated waveform comprises averaging the received read servo signals from consecutive servo bursts and wherein the measured distance comprises a distance between a positive peak and a negative peak of a dibit.

14. The tape drive of claim 13, wherein each read servo signal comprises dibits read within a frame, and wherein the averaging of the received read servo signals comprises measuring the dibits of the read servo signals at a same timing phase in the read frames of the read servo signals to determine an average for each dibit calculated from the read servo signals read at the same timing phase for the dibit.

15. The tape drive of claim 14, wherein the estimated waveform is calculated based on characteristics of the servo frame, and a velocity of the recordable medium.

16. The tape drive of claim 13, wherein the estimated signal sequence at sampling intervals is calculated as $$\hat{q}_C(mT_S; v) = \frac{1}{N}\sum_{l=0}^{N-1} r_C(mT_S - lT_F - \Delta(y); y, v), \quad -M_1 \le m \le M_2,$$

where $T_s$ comprises a sampling interval after interpolation, $T_F$ comprises a duration of a servo frame, N is a number of burst sequences, $M_1$ and $M_2$ are chosen so that the sampled burst sequences are entirely spanned, v is the velocity of the recordable medium, y is the lateral position of a read head with respect to the servo pattern on the recordable medium, and $\Delta(y)$ comprises a delay that depends on the lateral position of the read head.

17. The tape drive of claim 10, wherein the servo channel is further operable to:

initialize a counter in response to entering tracking mode;

increment the counter in response to a clock cycle;

generate a new reference waveform in response to the counter reaching a counter maximum value; and forward the new reference waveform to the correlator.

18. The tape drive of claim 17, wherein the servo channel is further operable to:

reset the counter to zero in response to generating the new reference waveform; and continue to increment the counter, perform the operation to generate the new reference waveform, and reset the counter to zero until servo operations end.

* * * * *